H. M. SMITH.
Preparing Tobacco.
No. 524.
Patented Dec. 20, 1837.
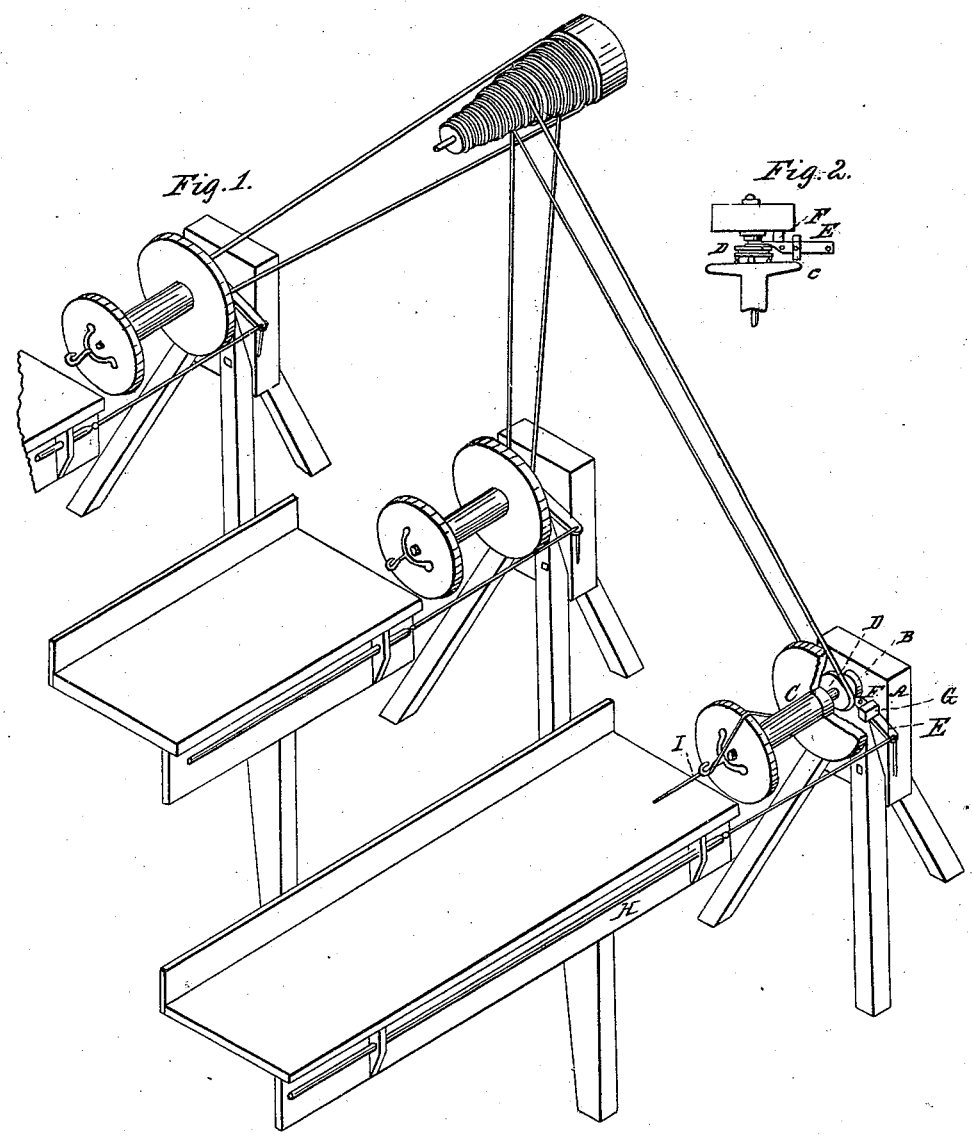

UNITED STATES PATENT OFFICE.

HIRAM M. SMITH, OF RICHMOND, VIRGINIA.

IMPROVEMENT IN MACHINERY FOR SPINNING TOBACCO.

Specification forming part of Letters Patent No. 524, dated December 20, 1837.

*To all whom it may concern:*

Be it known that I, HIRAM MOORE SMITH, of the city of Richmond, county of Henrico, and State of Virginia, have invented a new and useful Improvement on Machinery for Spinning Tobacco; and I do hereby declare that the following is a full and exact description.

The nature of my invention consists in the application of what is usually denominated a "clutch" to the end of the common spool used in spinning tobacco, to be removed from its intersection with the same whenever its motion is required to be checked or stopped, and in providing a friction-lever and making the same, in combination with the lever used, to remove the clutch, thereby enabling the spinner, at any point in the spinning-table, by the single operation of sliding a small rod, which may be done with his thumb and finger, to remove the clutch and apply the friction-lever to the end of the spool, and by this means prevent the spool from continuing to revolve after the clutch is removed, which it would otherwise do for some length of time from the momentum given it in spinning, and occasion loss of time in removing the thread from the hook or hollow axle preparatory to winding, or by twisting up and entangling the thread in case of its breaking, and by the above arrangement rendering it practicable to operate these spools, which have heretofore required manual power, and a separate power for each spool, by any kind of power used for other machinery, and to operate many spools by the same power, whether manual or otherwise.

To enable others skilled in the art to make and use my invention, I will proceed to describe its construction and mode of operation by occasional reference to the accompanying drawings, which may be measured to a scale of one inch to the foot by any person acquainted with isometrical perspective.

Figure 1 of these drawings represents the spools and ends of three tables as arranged to receive motion from a cone of pulleys. I shall refer only to the one lettered. I make a stand of any convenient form, as A, to which I confine an axle, B, of sufficient length to receive the spool C and whirl D, which revolve upon the same, allowing an inch of space between them. This spool I make in the usual form by preparing a barrel of wood the length of the spool required, and inserting brass boxes in the ends, and also fastening to the same heads made of plank, and turn the whole off together.

The whirl D, a section of which is shown in Fig. 2, I make of brass or other metal about four and one-half inches in diameter, with a groove for a round band, or in the usual way for a flat one, with two knobs projecting three-eighths of an inch from the side next the spool, which has corresponding projections, and with a neck projecting from the opposite side of sufficient length to receive a groove to admit the lever E, which I make of iron, and forked, so that the ends fit into the groove on opposite sides of the same. This lever is secured at F by a screw or pin, upon which it turns, passing through the lever and a piece of wood or iron made to project from the stand for that purpose. I attach to this lever a block, G, made of hard wood, with one end covered with leather to prevent its galling the spool, and which is about one and one-half inch square and three long, with an oblong mortise near its center, through which a bolt passes to confine the same to the lever at such distance from the spool-head as shall bring the two into contact when the clutch is removed. I connect this lever to the rod H by forming a knuckle-joint about three inches from the end of a piece of large iron wire, which has a screw formed upon it, and screwed into the same. The other end of this wire is bent at right angles and dropped through a hole in the lever, in which it fits loosely, and may be removed at pleasure.

To operate this machine a thread of tobacco is attached to the barrel of the spool, passed over the spool-head, and through the hook I upon the end of the table J, where it is held with the right hand of the spinner, while he slides the rod H with his left toward the stand, which intersects the knobs of the whirl and spool and gives motion to the latter. He now, in the usual way, forms a thread the length of the table, when he slides the rod from the stand, which removes the whirl from its intersection with the spool and brings into contact the friction-lever and spool-head, by which the spool is instantly stopped. The thread is now removed from the hook, the spool again started as before, and the thread wound upon the same. It is then stopped, the thread placed in the hook, and the operation repeated as before.

What I claim as my invention, and desire to secure by Letters Patent, is—

The combination of the clutch, friction-lever, and spool, in the manner above described.

H. M. SMITH.

Witnesses:
ERASTUS WILLEY,
D. S. BOGART.